United States Patent
Stevenson et al.

(10) Patent No.: US 6,846,089 B2
(45) Date of Patent: Jan. 25, 2005

(54) METHOD FOR STACKING SURFACE STRUCTURED OPTICAL FILMS

(75) Inventors: James A. Stevenson, Saint Paul, MN (US); Joseph J. Bianconi, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/439,450

(22) Filed: May 16, 2003

(65) Prior Publication Data

US 2004/0228106 A1 Nov. 18, 2004

(51) Int. Cl.[7] .......................... F21V 7/04; G02F 1/1335
(52) U.S. Cl. .......................... 362/31; 362/26; 362/561; 349/61
(58) Field of Search .......................... 362/31, 26, 27, 362/559, 560, 561, 19; 349/61, 62, 63, 64, 65

(56) References Cited

U.S. PATENT DOCUMENTS

| | | | |
|---|---|---|---|
| 4,542,449 A | 9/1985 | Whitehead | |
| 6,322,236 B1 | 11/2001 | Campbell et al. | |
| 6,354,709 B1 | 3/2002 | Campbell et al. | |
| 6,659,615 B2 * | 12/2003 | Umemoto | 362/31 |
| 6,742,921 B2 * | 6/2004 | Umemoto et al. | 362/561 |
| 6,747,801 B2 * | 6/2004 | Umemoto et al. | 362/31 |
| 6,751,023 B2 * | 6/2004 | Umemoto et al. | 349/62 |
| 2004/0141103 A1 | 7/2004 | Kotchick et al. | |

* cited by examiner

Primary Examiner—Thomas M. Sember
Assistant Examiner—B Q Truong
(74) Attorney, Agent, or Firm—Stephen W. Buckingham

(57) ABSTRACT

A display includes an optical film that has a surface structure, such as a prismatically structured surface for increasing the brightness of the display. The structured surface is bonded to an opposing surface of a second film using a layer of adhesive, by penetrating the structured surface into the adhesive layer to a depth less than a feature height of the structured surface. The bonded film structure provides additional strength to the films and reduces the possibility of film damage during display assembly.

45 Claims, 12 Drawing Sheets

METHOD FOR STACKING SURFACE STRUCTURED OPTICAL FILMS

FIELD OF THE INVENTION

The present invention is directed to optical displays, and more particularly to an approach for packaging light management optical films used in optical displays.

BACKGROUND

Optical displays, such as liquid crystal displays (LCDs) are becoming increasingly commonplace, finding use, for example, in mobile telephones, hand-held computer devices ranging from personal digital assistants (PDAS) to electronic games, to larger devices such as laptop computers, and LCD monitors and television screens. The incorporation of light management films into optical display devices results in improved display perfonmance. Different types of films, including prismatically structured films, reflective polarizers and diffuser films, are useful for improving display parameters such as output luminance, illumination uniformity, viewing angle, and overall system efficiency. Such improved operating characteristics make the device easier to use, and the concomitant reduction in battery requirements may allow the size of the battery to be reduced, or for the time between battery chargings to be increased. Even in displays that do not use batteries, light management films are often useful for reducing the complexity of the display, and can lead to breakthrough performance in terms of luminance, uniformity, power efficiency, heat management, and other characteristics.

The light management films are typically stacked, one by one, into the display frame between a backlight assembly and the flat panel display. The stack of films can be optimized to obtain a particular desired optical performance. From a manufacturing perspective, however, several issues can arise from the handling and assembly of several discrete film pieces. These problems include, inter alia, the excess time required to remove protective liners from individual optical films, along with the increased chance of damaging a film when removing the liner. In addition, the insertion of individual sheets into the display frame to build the stack of films is time consuming and provides further opportunity for the film to be damaged. All of these problems can contribute to diminished overall throughput or to reduced yield, which leads to higher system cost.

SUMMARY OF THE INVENTION

In view of the problems listed above, the present invention is directed to a new packaging method in which optical films are bundled together before insertion into the display frame. This bundling makes handling of the films easier, reduces the number of steps required for assembly of the display device, reduces the chance of damaging the films and increases yields.

Generally, the present invention relates to an approach to bonding optical films that have a surface structure, such as prismatically structured light directing films. The invention includes bonding the structured surface of one film to an opposing surface of a second film using a layer of adhesive, by penetrating the surface features into the adhesive to a depth that is less than the feature height.

In one particular embodiment, the invention is directed to a light management film package for managing light within a display. The package includes a first, brightness enhancing optical film having a first surface structured with prismatic ribs, the ribs having associated rib heights. A second optical film has a second surface opposing the first surface of the first optical film. There is a first layer of adhesive on the second surface. At least some of the prismatic ribs of the first surface penetrate into the first layer of adhesive. The first layer of adhesive has a thickness less than the associated rib heights of the ribs penetrating into the first adhesive layer.

Another embodiment of the invention is directed to a display system, that comprises an illumination unit and a display unit. A light management unit is disposed between the illumination unit and the display unit to manage light passing from the illumination unit source to the display unit. The light management unit comprises a first optical film having a first surface structured with prismatic ribs, the ribs having associated rib heights. A second optical film has a second surface opposing the first surface of the first optical film. There is a first layer of adhesive on the second surface. At least some of the prismatic ribs of the first surface penetrate into the first layer of adhesive. The first layer of adhesive has a thickness less than the associated rib heights of the ribs penetrating into the first adhesive layer.

Another embodiment of the invention is directed to a method for stacking optical films. The method comprises pressing prismatic ribs of a prismatically ribbed, first optical film into a first adhesive layer on a surface of a second optical film to a depth so as to leave a gap between portions of the prismatic ribs and the first adhesive layer.

Another embodiment of the invention is directed to a light management film package for managing light within a display. The package comprises a first optical film having a first surface structured with refractive features, the refractive features including active refractive surfaces for light to pass therethrough. A second optical film is disposed over the first optical film, the second optical film having a second surface. There is a first layer of adhesive on the second surface. At least some of the refractive features penetrate partially into the first layer of adhesive so as to leave a gap between the first adhesive layer and portions of the first surface. Portions of the active surfaces of the penetrating features interface with the gap and other portions of the penetrating features interface with the first adhesive layer.

Another embodiment of the invention is directed to a display system that includes an illumination unit and a display unit. A light management unit is disposed between the illumination unit and the display unit to manage light passing from the illumination unit source to the display unit. The light management unit comprises a first optical film having a first surface structured with refractive features. The refractive features include active refractive surfaces for light to pass therethrough. A second optical film is disposed over the first optical film and has a second surface. There is a first layer of adhesive on the second surface. At least some of the refractive features penetrate partially into the first layer of adhesive so as to leave a gap between the first adhesive layer and portions of the first surface. Portions of the active surfaces of the penetrating features interface with the gap and other portions of the penetrating features interface with the first adhesive layer.

Another embodiment of the invention is directed to a method for stacking optical films. The method comprises pressing active refractive surfaces of refractive features of a first optical film into a first adhesive layer on a surface of a second optical film to a predetermined depth so as to leave a gap between the first adhesive layer and portions of the active refractive surfaces. Other portions of the active refractive surfaces contact adhesive of the first adhesive layer.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
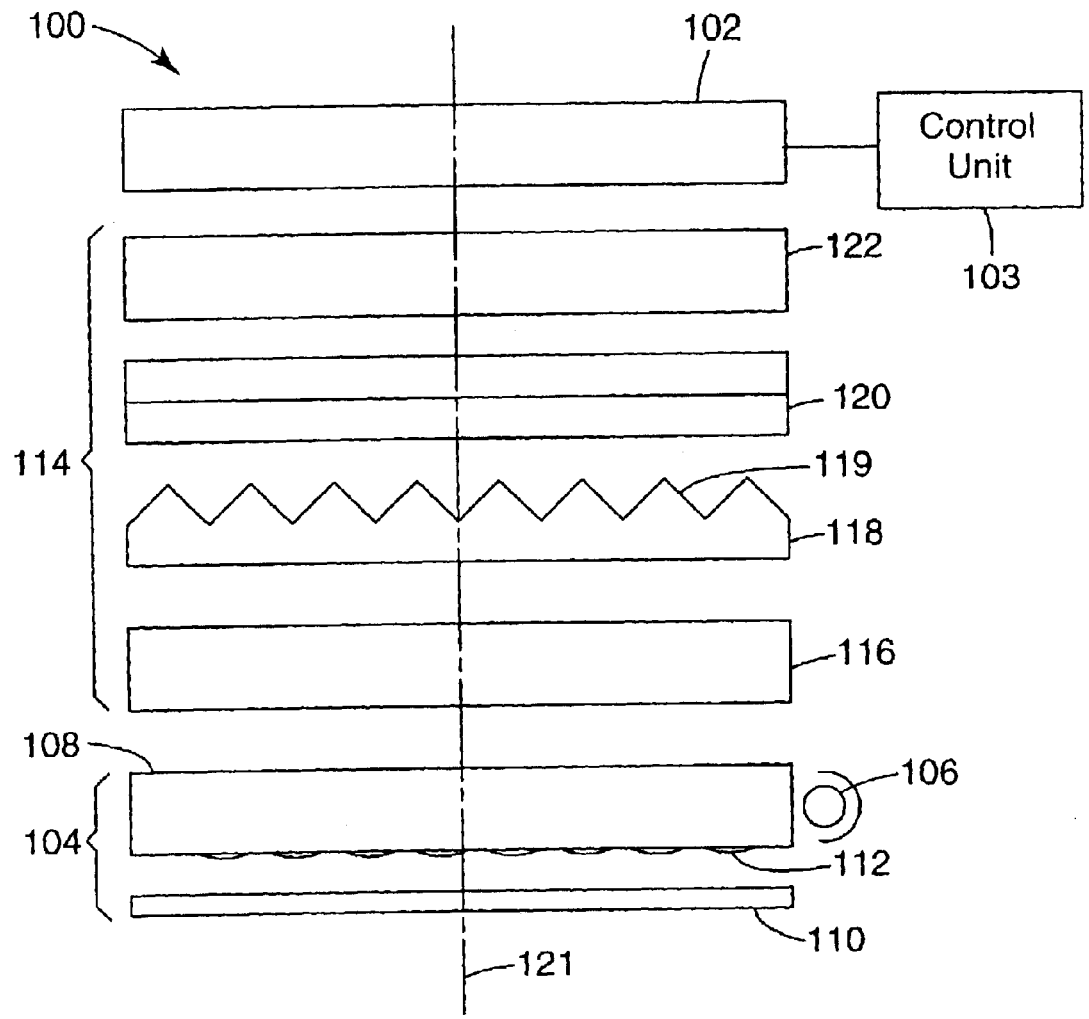
FIG. 1 schematically illustrates an embodiment of display unit.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTLON

The present invention is applicable to displays, such as liquid crystal displays, and is believed to be particularly useful for reducing the number of steps required for making such a display.

A display system 100 is schematically shown in FIG. 1. The system includes an electronic display unit 102, such as a liquid crystal display (LCD) panel, which is typically sandwiched between two glass layers. Furthermore, the display unit 102 may include absorbing polarizers above and below the LCD panel to provide polarization contrast typically required for producing a polarization-based image. The display unit 102 may be coupled to a control unit 103 that controls the image displayed on the display unit 102.

A backlight assembly 104 is typically used for providing light through the display unit 102 when there is insufficient ambient light for the user to view the image formed by the display unit 102. In one particular embodiment, the backlight assembly 104 may include several elements such as a light source 106, a lightguide 108, and one or more reflector layers 110. An important feature of the display system 100 in many applications is that the total thickness of the system 100 be small. Accordingly, the light source 106 is commonly positioned to the side of the light guide 108, and the lightguide 108 directs the light from the light source 106 up through the system 100 towards the display element. The light source 106 may be any suitable type of light source. In many applications, it is desirable to illuminate the display 100 with white light, in which case the light source 106 may be one or more fluorescent lamps, an array of light emitting diodes whose colors are mixed to produce white light, or the like. Some displays may arrange light sources 106 along more than one edge of the light guide 108.

In the illustrated embodiment, the light guide 108 is provided with diffusely reflecting regions 112 that direct light from the light guide 108 towards the display unit 102. The light guide 108 may include other types of elements for directing light towards the display unit 102, such as light extraction regions on the upper surface of the light guide 108 facing the display element.

Other embodiments of backlight assembly 104 may also be used, for example, the backlight assembly 104 may be formed with an array of lamps positioned in a suitable reflective cavity often with a diffuser plate that covers the lamps. While there are several other options for the design of backlight assembly 104, it should be appreciated that the specific design of the backlight assembly 104 is not important for the present invention.

A number of light management films are typically interposed between the backlight assembly 104 and the display unit 102 in a light management film stack 114. The light management film stack 114 typically contains a number of films to control various optical characteristics of the light incident on the display unit 102. For example, the light management film stack may include a first diffuser film 116 for uniformizing the intensity of the light passing up through the film stack 114.

Films 118 and 120 may be structured films, each having a row of prism-shaped ribs 119 running across its upper surface. The prism-shaped ribs help to direct the light towards the axis 121 of the system 100. The ribs 119 of the film 118 redirect the light within the plane of the figure. The ribs of the film 120 are typically arranged perpendicular to those of the film 118 so that the ribs of the film 120 redirect the light in a direction out of the plane of the figure. This may be referred to as a crossed-structure configuration. In another embodiment (not shown), the layers 118 and 120 may be substituted with a single structured optical film that redirects light received from the backlight assembly 104.

The stack 114 may also include a reflective polarizer layer 122. This layer is useful for recycling light from the backlight assembly 104 that is in the wrong polarization for transmission through the display unit 102 as image light. The light reflected by the reflective polarizer 122 may be diffusely reflected by the reflector 110, with some polarization mixing, so that at least a portion of the reflected light makes it through to the display unit 102 with the correct polarization for use as image light. Another diffuser layer (not shown) may also be interposed between the reflective polarizer 122 and the display unit 102.

It should be noted that, depending on the actual system design, some of the elements represented by layers 116–122 may be missing, added to, or substituted with other functional elements. For example, one or more sheets may be added as cover sheets that may or may not have diffusive properties. The cover sheets may have a matte finish or other type of randomized surface structure for reducing the appearance of defects in the image. Other light control films may be included, for example diffusion sheets having a light control function are often added in film stacks. Additionally, backlights may include a conductive coating, such as indium tin oxide (ITO), for electromagnetic shielding. Such a conductive coating may be coated on a separate film or on one or more of the light control films in the film stack.

With such a backlight assembly 104, each of the discrete optical film layers 116–122 is conventionally inserted individually to the display frame during manufacture. Since it is often important to reduce the thickness of the films 116–122, to reduce overall display thickness, the individual films 116–122 may be made very thin. As a result, the individual film stiffness may be low, which can result in increased difficulty in handling, processing, and assembly during manufacture. Also, because these film layers often have precise optical functionality, the introduction of surface defects, such as scratches or debris may compromise total system performance. Often, each film layer is provided by the manufacturer with dual side protective liners, which must be removed prior to insertion into the backlight assembly. The action of liner removal and the resulting insertion into the backlight assembly can expose the delicate film to a host of potential modes of defect introduction. Examples of such defects include scratching, and the attraction of lint and other debris to the film surfaces due to the build up of static electricity. When multiple film layers are incorporated into the backlight assembly, the probability of creating/introducing a defect can grow ever higher, which can result in slower manufacturing throughput due to excessive re-work and higher unit costs.

This invention is directed to approaches to bundling various optical film layers in order to improve handling and final backlight/system assembly efficiency. In addition, the bundling of films may improve stiffness and result in films that are more mechanically stable.

One method of bundling multiple optical layers includes inserting an adhesive layer between each of the films. The adhesive layer may lie across the entire stack, from edge to edge, may be positioned along one or more edges of the stack, or may be patterned over the area of some or all of the film layers.

Figure 2A:
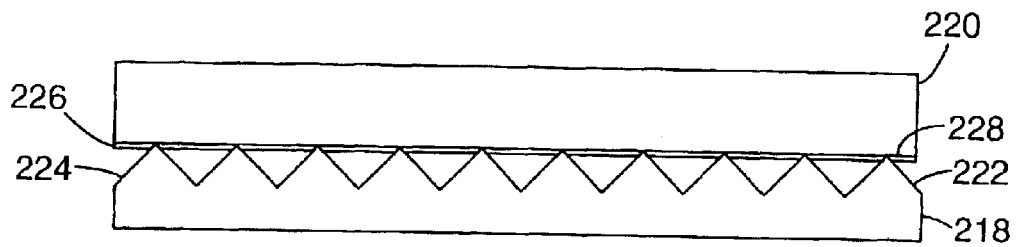
FIGS. 2A and 2B schematically illustrate light management film units having at least one film with a structured surface, according to different embodiments of the present invention.

One approach to forming a bonded film stack 200 according to the present invention is schematically illustrated in FIG. 2A. Layers 218 and 220 represent different optical layers as may be found in a light management film stack in a display system. For example, layer 218 has a structured surface 222 on the side opposing layer 220. The structured surface 222 contains features that are typically used for refracting light passing through the film 218. In the illustrated embodiment, the structured surface 222 is a prismatic surface having ribs 224 with a prismatic cross-section. One example of such a film is BEFtype film available from 3M Company, St. Paul, Minn. The second film 222 has a layer of adhesive 226 on its lower surface 228. Parts of the structured surface 222 penetrate into the adhesive layer 226, with the result that the lower film 218 adheres to the upper layer 220.

It will be appreciated that the structured surface 222 need not be limited to prisms having the cross-section of an isosceles triangle, but may also include ribs having different types of cross-sections. For example, the cross-sections of the ribs may include other types of triangular prisms, truncated prisms, rounded prisms, and curves such as sinusoids or paraboloids. In addition, the structured surface 222 need not be limited to being structured with ribs and may be structured with pyramids and/or posts.

The upper layer 220 may be any desired type of film, such as another structured film, a reflective polarizer film, and absorbing polarizer film, a diffuser layer, and the like. A reflective polarizer film may include any suitable type type of reflective polarizer, including, but not limited to a multiple layer polymeric reflective polarizer, a wire grid reflective polarizer, a cholesteric reflective polarizer, and a diffuse reflective polarizer.

Furthermore, the layer 218 having the structured surface 222 may operate as a turning film, where light passes from the upper layer 220 to the lower layer 218 at a large angle relative to a film axis. The film axis lies perpendicular to the plane of the film. Light may enter one of the prismatic ribs 224 through one surface and then be totally internally reflected at the next surface, so as to propagate in a direction closer to the film axis.

One of the film layers 218 and 220 may be provided with a conductive coating, such as a layer of indium tin oxide (ITO) or a conducting polymer, or the adhesive 226 may be a conducting adhesive layer. Provision of a conducting layer may be useful for providing electrical shielding of electrical components from electrical noise and interference. Furthermore, the adhesive layer 226 may be provided with pigments or dyes so as to adjust the visible light spectrum of the light passing through the stack of films.

It is desirable in some circumstances to build a packaged stack of optical films where the approach of bonding the film layers together provides the ability to maintain the desired refractive and reflective properties of any surface structure and, particularly in space-limited applications, adds little or no thickness to the stack thickness. The adhesive layer 226 may be used without adding significant thickness to the film stack, which is advantageous in such applications where the space is limited. For example, a thin layer of adhesive 226 may be used, with the structured surface 222 penetrating all the way through the adhesive to the surface 228 on the other side of the adhesive 226.

Figure 2B:
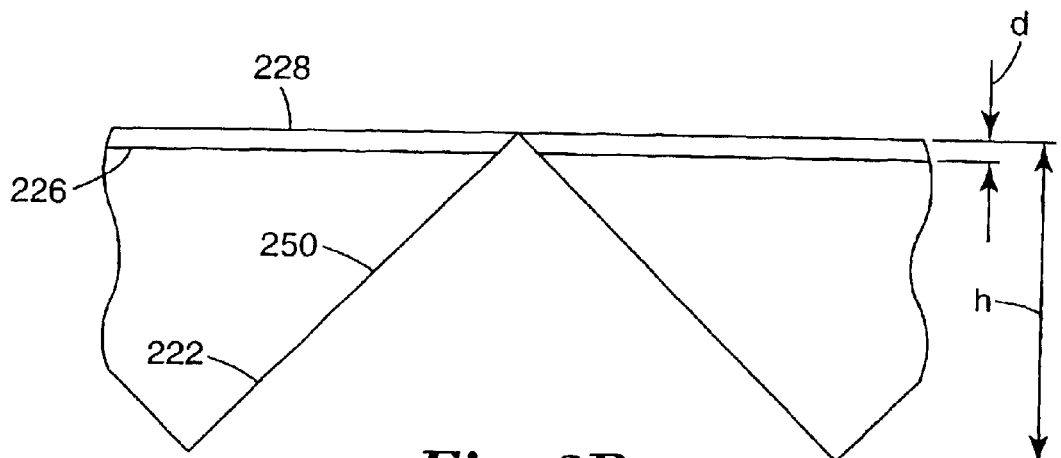

It may be desirable, under some circumstances, to use a relatively thick layer of adhesive. The term "thick" under these circumstances means that the thickness of the adhesive layer is a significant fraction of the height of the structures of the structured surface, for example one quarter or more. For example, it may be desirable to provide some additional functionality to the adhesive layer 226, in which case the optimum thickness of the adhesive layer may be greater than that thickness needed only to adhere the structured surface to the underlying layer. In such cases, the lamination process may be controlled so as to ensure that the structured surface 222 penetrates into the adhesive layer 226 to a controlled depth, see FIG. 2B, and does not penetrate all the way to the surface 228 of the layer 220 on the other side of the adhesive layer 226. Penetration of the structured surface 222 too far into the adhesive layer 226 results in an unacceptably high reduction in the refractive and reflective properties of the structured surface 222. Controlling the penetration depth, however, reduces the possibility of such degradation in the refractive and reflective properties of the structured layer, while providing adhesion between the structured surface and the underlying layer and providing a desired optical characteristic in the adhesive.

Figure 2C:
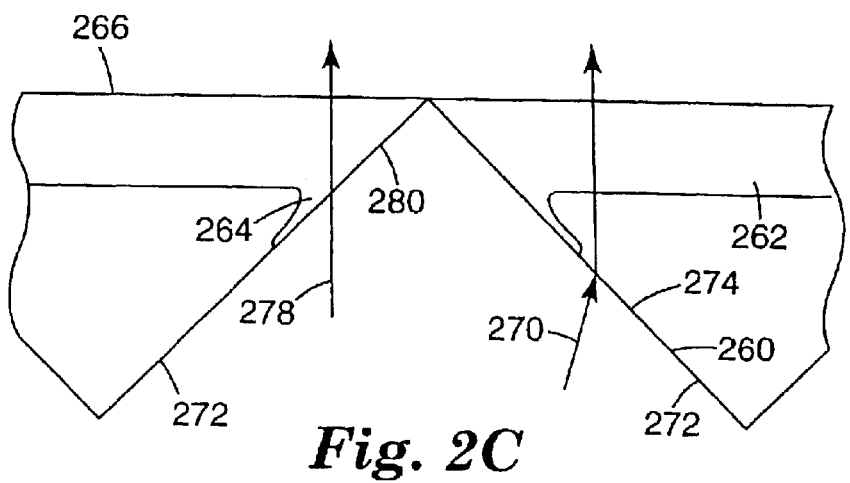
FIGS. 2C and 2D schematically illustrate embodiments of light management film units with different thicknesses of adhesive, according to principles of the present invention.

An expanded view of a surface feature 250 extending into the adhesive layer 226 is schematically illustrated in FIG. 2C. The height of the surface feature is h and the thickness of the adhesive layer 226 is d. In the illustrated embodiment, the feature 250 has been pressed into the adhesive layer 226 so as to reach to the surface 228 of the upper layer. The optical power, in other words the reflective and refractive properties, of the structured surface 222 is affected less when the layer of the adhesive 226 is thinner. The thickness, d, should be less than the height, h, is preferably less than 50% of h, and more preferably is less than 20% of h. In other embodiments, not illustrated, the feature 250 may not be pressed into the adhesive layer 226 so as to contact the surface 228. Instead, the feature 250 may be pressed partially into the adhesive layer 226. In such a case, it is preferable that the depth of penetration into the adhesive layer is less than 50% of h, and more preferably less than 20% of h.

Figure 2D:
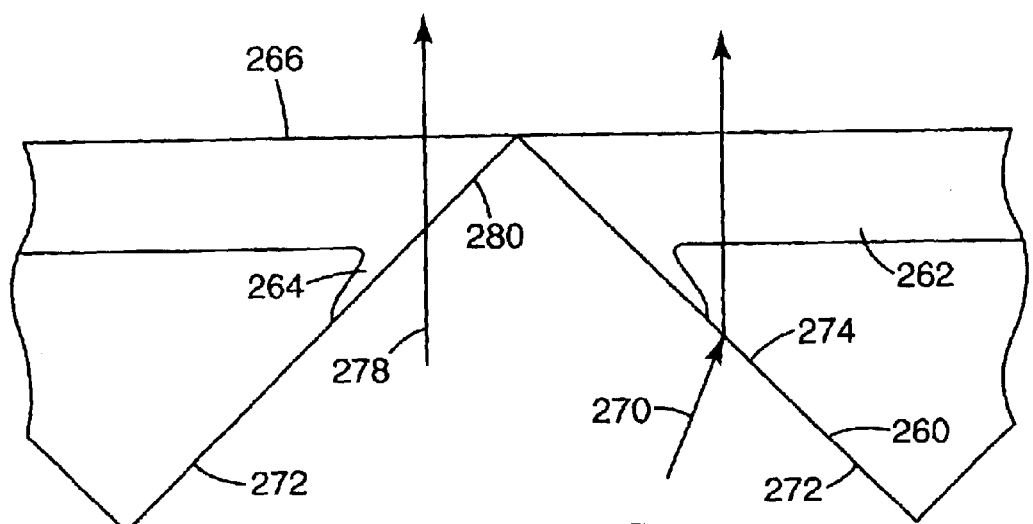

Another feature of the invention is illustrated in FIG. 2D, which shows a feature 260 penetrating into a layer of adhesive 262. The adhesive close to the feature 260 does not necessarily lie parallel to the surface 266 of the upper layer, but may wick along the side of the feature 260. The extent of the wicking 264 depends on several factors, such as the material used as the adhesive, the (rheology) of the adhesive material, the degree of cross-linking in the adhesive material, the surface energy of the adhesive material and of the structure, the temperature at which the feature 260 is made to penetrate the adhesive material, and the process conditions of the laminating process, such as pressure, speed, and temperature, of the lamination process.

An example of a light ray 270 is shown passing through the feature 260, illustrating how the light is refracted by the portion 274 of the refractive surface 272 into the gap 276 between the surface 272 and the adhesive 262. Another light ray 278 is shown passing through the portion of the refractive surface 272 contacting the adhesive 262. The entire surface 272 may be described as being active, in that the entire surface 272 may be illuminated with light. Part 280 of the active surface 272 is contacted to the adhesive 262 while the other part 274 is not contacted to the adhesive 262. Since the reflective and refractive characteristics of the active surface 272 are changed when the surface 272 is in contact with adhesive, the changes in the reflective and refractive characteristics of the active surface 272 are reduced when the layer of adhesive is thinner. However, it is also important to provide sufficient adhesion to prevent the adhered layers from peeling away from each other when being, for example, handled in the manufacture of a display.

As was suggested above, the adhesive layer may provide more functionality than simple adhesion. For example, diffusive particles may be dispersed within the adhesive to obtain bulk diffusive characteristics. In another example, the adhesive layer may be provided with dyes and/or pigments so as to color the light passing through the film stack. Diffusion characteristics may also be added in other ways, such as including a component in the adhesive whose phase separates from the remainder of the adhesive mixture.

EXAMPLE 1

Samples of the construction illustrated in FIG. 2A were made using a prismatically structured film that had a 50 $\mu$m thick substrate with prismatic structures 12 $\mu$m in height. The apex angle of the prismatic features was about 90°. The samples were made by applying a thin coating of adhesive to the planar side of a sheet of 3M Thin Brightness Enhancement Film (TBEF). A second sheet of TBEF was laminated to the adhesive with the prismatic grooves oriented approximately 90° to the grooves of the first sheet.

Figure 3:
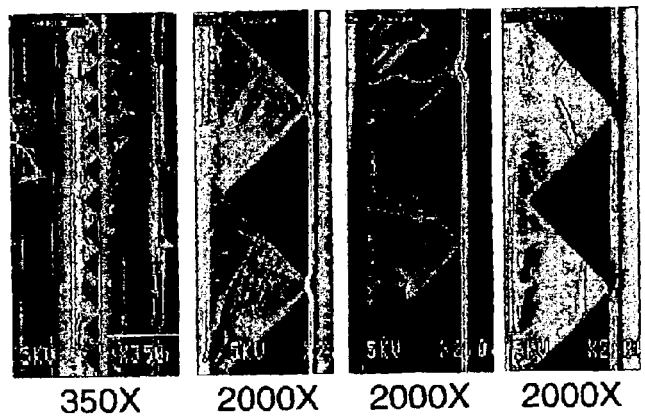
FIG. 3 presents various scanning electron microscope (SEM) cross-sections of a sample laminate construction assembled according to principles of the present invention.
Figure 4:
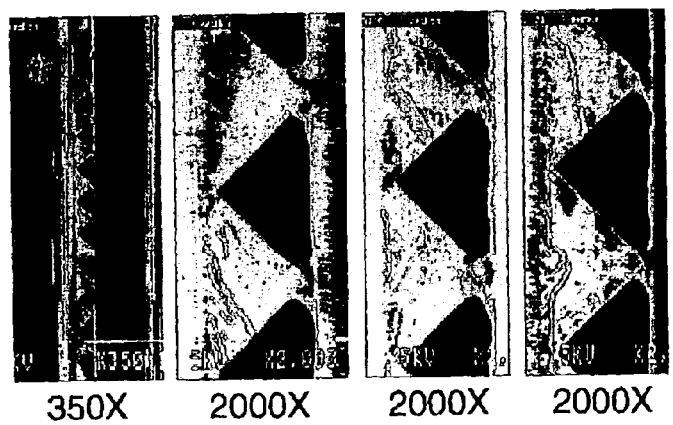
FIG. 4 presents various SEM cross-sections of another sample laminate construction assembled according to principles of the present invention.

Cross-sections through the structures, taken using a scanning electron microscope (SEM), are illustrated in FIGS. 3 and 4 for two sets of laminates formed using different adhesives. The adhesive used for the construction shown in FIG. 3 was a layer, approximately 1 $\mu$m thick, of iso-octyl acrylate/acrylic acid (IOA/AA) in the ratio of 81%/19%, crosslinked at 0.15% Bisamide to adhesive solids. The adhesive used for the construction shown in FIG. 4 was a layer of UV curable urethane with a mixture of iso-octyl acrylate/acrylic acid/methyl acrylate in the ratio 57.5%/35%/7.5%. This adhesive was not cross-linked.

One important feature for controlling the optical properties of the laminated film construction is the depth of prism tip penetration into the adhesive. Typically, as penetration increases, the on-axis brightness of the light passing the films is reduced. The depth of penetration includes the amount of wicking at the tips. For example, a softer, less viscous adhesive can wick further up the tips and can have a much higher effective depth of penetration than a stiffer, more viscous adhesive with the same thickness.

An important difference between the SEM images in FIGS. 3 and 4 is the amount of adhesive wicking up the tips. The softer, more mobile, adhesive shown in FIG. 4 wicks much further than the stiffer adhesive shown in FIG. 3. Thus, the brightness of light passing through the construction is a good predictor of depth of penetration. Also, brightness, given the same thickness and refractive index, is a good predictor of the amount of wicking that takes place. The depth of penetration may be inferred by measuring the peak or on-axis brightness. This is an important feature when comparing the properties of different adhesives. The different adhesives should have similar wet out characteristics, such as surface energy and mobility, or comparisons of factors such as refractive index and adhesion will be confounded. While surface energy is also involved with the depth of penetration, it becomes less important as stiffness is increased. Thus, if the adhesive is hardened to a sufficient degree, surface forces are insufficiently strong to change the shape of the adhesive, and wicking can be ignored.

EXAMPLE 2

Figure 5:
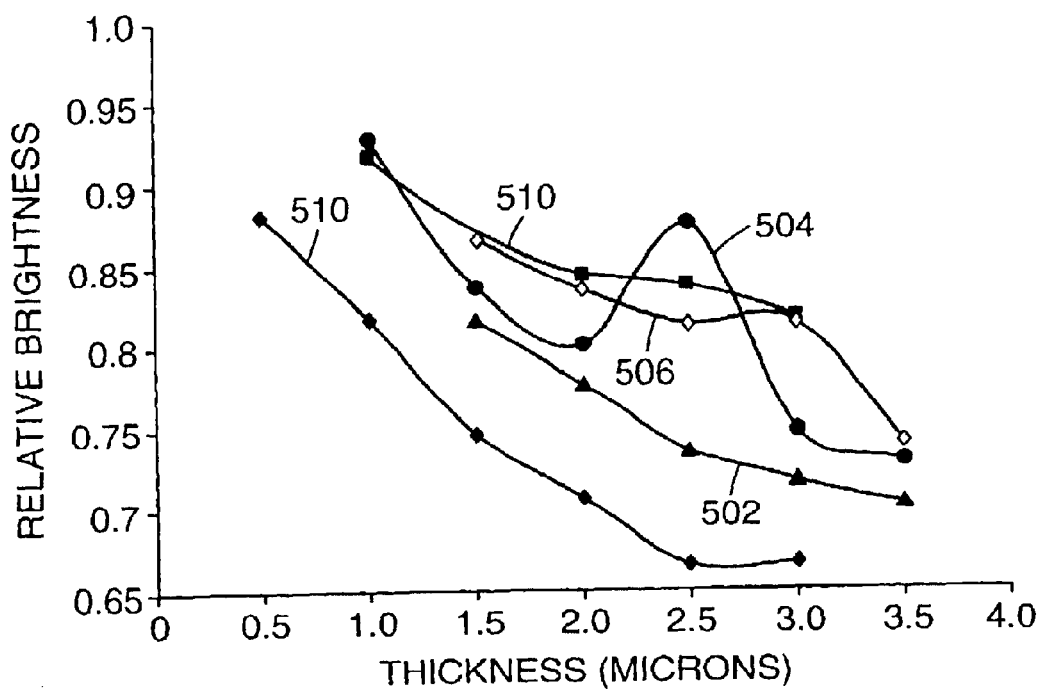
FIG. 5 presents a graph showing the relationship between relative brightness and adhesive thickness, for samples fabricated according to principles of the present invention, using various types of adhesives.

Several laminated constructions of crossed TBEF film were formed using different types of adhesives, over a variety of layer thickness. The brightness of light passing through the constructions was measured and normalized against a pair of crossed TBEF films that had no adhesive: the results are presented in FIG. 5. Optical brightness of the laminate constructions was measured using an Autronic Conoscope which measures the brightness distribution versus angle that passes through the film.

Five different types of adhesives were used in the experiments. Curve 502 corresponds to a layer of urethane acrylate (UA) and iso-octyl acrylate (IOA) acrylic acid (AA) having a first level of cross-linking. Curves 504 and 506 correspond also to urethane acrylate, at respectively increased levels of cross-linking of the IOAAA component. Curve 508 corresponds to a layer of iso-octyl acrylate/acrylic acid (IOA/AA) and curve 510 corresponds to a layer of epoxy acrylate (EA) and IOA/MA/AA without cross-linking.

In general, the brightness decreases with increased adhesive thickness. The plots indicate that the depth of penetration is different for each of the adhesives. As the amount of cross-linking in the UA layers increases, so does the brightness, thus demonstrating that the brightness of the construction increases with the adhesive stiffness. It may also be inferred that the IOA/AA adhesive is stiffer than the UA/IOA/AA adhesives, which in turn are stiffer than the EA/IOA/MA/AA adhesive.

The adhesive used in forming the laminated construction may be partially cross-linked before lamination and/or partially or fully cross-linked after lamination. Adhesives that offer the possibility of partial cross-linking before and after lamination provide the advantage of permitting the adhesive properties to have different properties for the lamination process and in the finished product. This permits the selection of a desirable lamination rheodlogy to improve the selection of the optical characteristics of the laminated construction while later limiting the ability of the adhesive to flow, thus providing increased long term stability. The adhesives discussed above contain a UV curable Urathane or Epoxy. These are chosen for their high adhesion to both substrates, most particularly the prism tips, and their ability to be postcured. These UV curable adhesives are combined with a standard pressure sensitive adhesive (PSA) whose chemistry does not interfere with the ability to be postcrosslinked. It is benefical that the chosen PSA additive has good adhesion to assist with lamination and that its rheology can be easily altered to adjust wet out. IOA/AA and IOA/MA/A copolymers are candidate PSAs. It should also be noted that this construction does not necessarily require a PSA. Adhesive systems that are not typically termed PSAs may also be used.

EXAMPLE 3

The environmental stability of the laminated construction was tested by exposing samples of the laminated construction fabricated using IOA/AA and a blend of IOAAA or IOA/MA/AA and UV curable epoxies or urethanes to temperatures of 100° C., 85° C., and 65° C. at a relative humidity of 95% for 1 week. All the samples passed visual inspection, and there were no failures due to separation or bubbling. This is due to the ability of gasses to move in and out of the laminate very easily. All samples did curl to a certain degree. Curling is thought to occur because of the difference in expansion coefficients between down and cross web directions. The curl remains in the sample because the adhesive can shift in the heated environment. The curling may be reduced by using adhesives having a higher glass transition temperature, by crosslinking to a higher degree, or by matching the expansion coefficients. Curl is not an issue for assemblies, where the film layers are held flat in the display.

The adhesives tested in environmental conditions were IOA/AA@0.15 to 0.3% Bisamide crosslinker, UA & IOA/AA blends at 0.1 to 0.3% Bisamide crosslinking, and EA & IOA/MA/AA blends.

In relatively softer adhesives, the brightness of the laminate construction reduced by as much as 9 percentage points, while samples that were further cross-linked after lamination showed a difference in brightness of ±1–2%. In general, the post cross-linked samples improved in brightness slightly during environmental exposure where the adhesive layer was thinner.

EXAMPLE 4

The adhesive properties of the different laminate constructions discussed in Example 2 were tested for peel strength.

Figure 6:
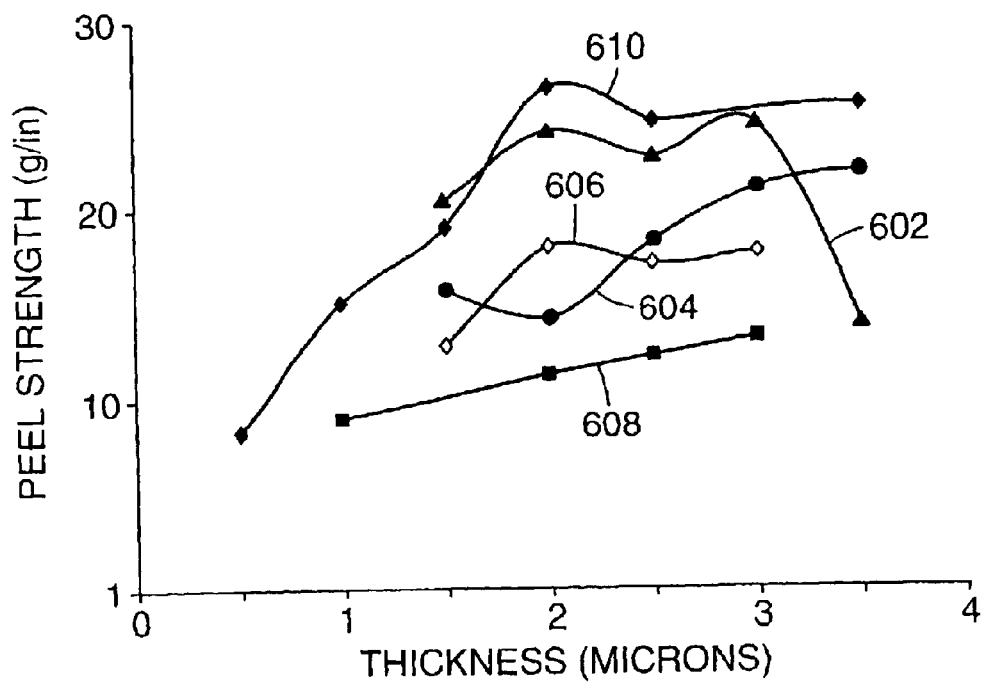
FIG. 6 presents a graph showing the relationship between adhesive peel strength and adhesive thickness, for samples fabricated according to principles of the present invention, using various types of adhesives.

It was found that post-curable adhesives increased peel strengths. By adjusting the ratio of the post-curable to the pre-curable components, increased peel strengths may be obtained. The plots provided in FIG. 6 show the peel strengths as a function of adhesive thickness. Curves 602, 604, and 606 respectively correspond to the UA adhesive layers described above with regard to curves 502, 504 and 506 in FIG. 5. Likewise, curve 608 corresponds to the IOA/AA adhesive layer discussed above with respect to curve 508 in FIG. 5 and curve 610 corresponds to the EA adhesive layer discussed above with respect to curve 510 in FIG. 5. Note that the adhesion is provided in a logarithmic scale. The peel strengths are all 1800 peels at 4"/min.

Figure 7:
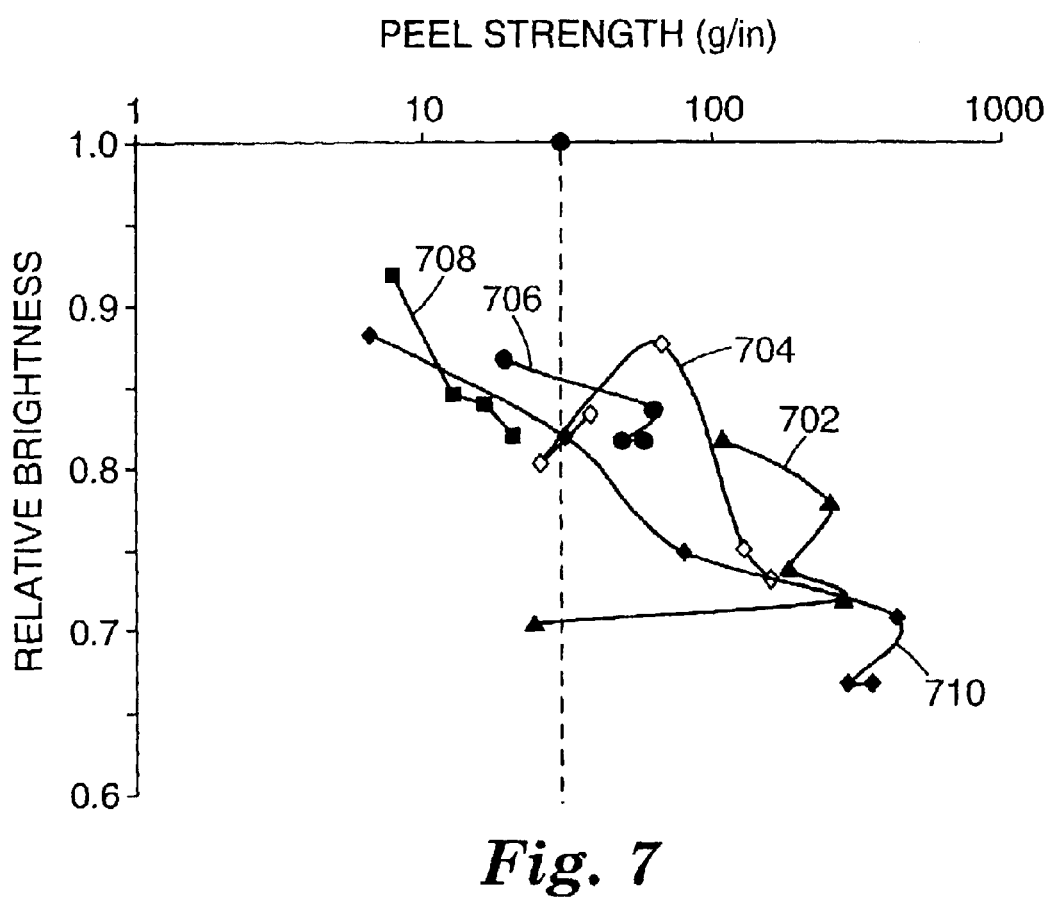
FIG. 7 presents a graph showing the relationship between relative brightness and adhesive peel strength, for samples fabricated according to principles of the present invention, using various types of adhesives.

Another graph, presented in FIG. 7, shows the brightness, normalized to crossed TBEF films without adhesive, as a function of adhesion. Curves 702, 704 and 706 correspond respectively to the UA adhesives discussed above with respect to curves 502/602, 504/604 and 506/606 in FIGS. 5 and 6. Curve 708 corresponds to the IOO/AA adhesive discussed above with respect to curves 508 and 608 in FIGS. 5 and 6. Curve 710 corresponds to the EA adhesive discussed above with respect to curves 510 and 610 in FIGS. 5 and 6. This graph presents useful information, since practical considerations of laminate constructions suggest that the construction should have relatively higher brightness and relatively higher adhesion. Thus, those points lying in the upper right hand quadrant would appear to provide the more desirable combinations of adhesive strength and optical brightness. It is believed that points having an adhesion of 30 g/in or more are sufficiently strong to be able to resist delamination during cutting operations and the subsequent removal of the protective liner, without regard to the liner removal technique. The survival of constructions having an adhesion less than about 30 g/in may depend on the liner removal process.

EXAMPLE 8

Figure 8A:
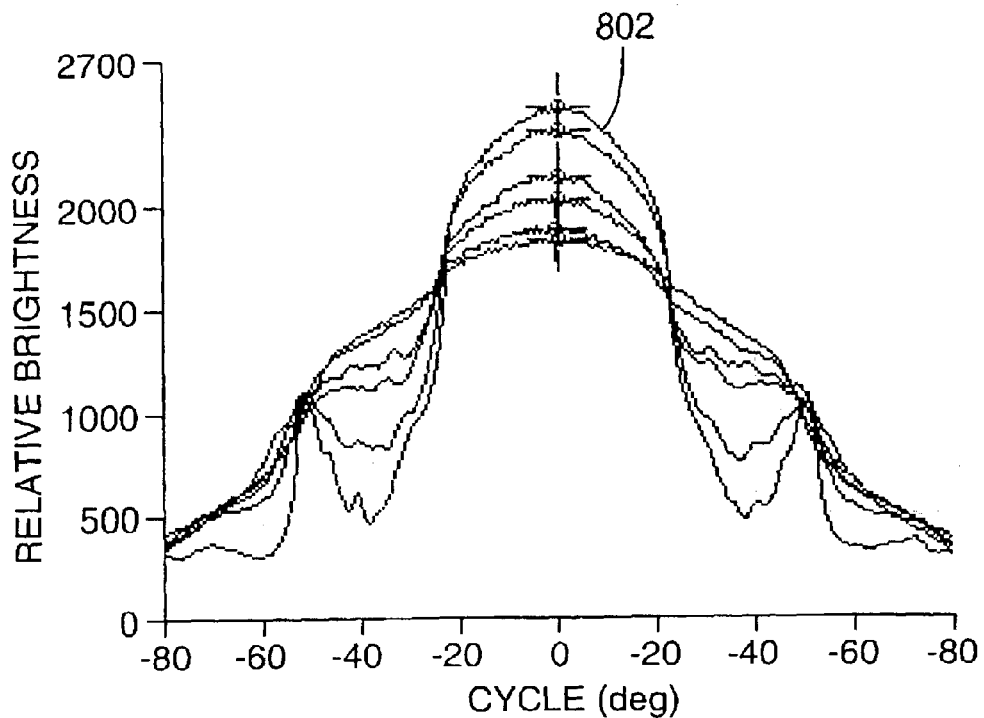
FIGS. 8A and 8B present graphs showing the brightness as a function of viewing angle for samples fabricated according to principles of the present invention, using various types of adhesives.
Figure 8B:
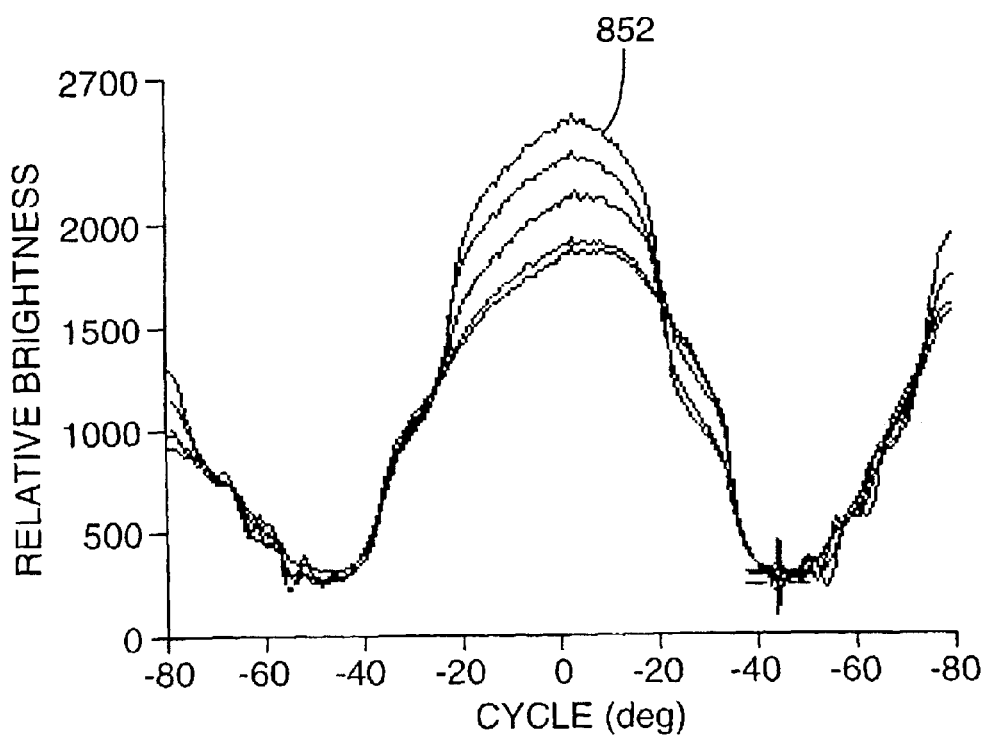

The optical characteristics of the laminate construction, such as the optical gain (brightness), viewing angle, Moiré pattern, diffusion, and the ability to hide defects, may all be affected by the adhesive and/or the lamination technique. The horizontal and vertical viewing angles of the laminate construction, fabricated with different types and thicknesses of adhesive, are illustrated respectively in the graphs shown in FIGS. 8A and 8B. In each graph, the relative brightness for light passing through the laminate construction is plotted as a function of angle relative to the normal. The curves 802 and 852, corresponding to the highest gain were obtained using crossed TBEF, without adhesive. These curves also correspond to the narrowest viewing angle. The other plots correspond to a variety of laminate constructions using TBEF. The adhesives used in this plot are the UA versions at different initial cross-linking levels. These plots show the versatility of the laminate construction. The viewing angle may be varied, a property that may be valuable in applications requiring softer cutoffs and wider viewing angles. It should also be noted that the larger viewing angle constructions are mechanically more stable because adhesion is higher.

No reflective Moiré pattern is observed in the laminate construction by itself. Furthermore, the reflective Moiré pattern visible when used in a PDA was reduced when compared to unadhered crossed TBEF construction.

The laminate construction also produces more diffusion than the unadhered, crossed TBEF. The amount of diffusion increases with an increased adhesive thickness. Diffusion can be used to tailor the light profile for specific applications. Accordingly, the laminate construction affords the possibility that a display may not require a separate diffuser in the film management stack, thus further reducing the height and cost of the film management stack. One approach to increasing diffusion is to microreplicate patterns into the adhesive layer. A linear pattern formed in the adhesive layer that is parallel to the upper prisms may provide diffusion without measurably changing the brightness or the viewing angle. Particles or stress induced index changes may also be used to increase the diffusion.

The laminate construction provides the ability to increase the uniformity of the appearance. This property may arise from one of the following effects. One effect is the elimination of surfaces that can be inspected. Defects that occur in the center of the sheets may be hidden by the natural diffusion of the laminate construction thus rendering these anomalies non-functional. Another effect is index matching of the prism tips by the adhesive layer. Damaged prism tips may be buried in the adhesive. Thus, damaged tips that are buried within the adhesive are less likely to cause significant defects, since the prism tips are index matched, at least to some extent. Small defects at the tips may disappear completely, while larger tip defects are reduced in magnitude. Another effect is the added diffusion provided by the laminate construction. This is believed to come from two distinct light distributions. One distribution is the usual distribution of light through the stack and the other, a new distribution that is caused by the refractive and reflective differences in the area that is in contact with the adhesive. These two different distributions become a mix of light which makes an image harder to resolve.

The laminate construction is typically manufactured using lamination conditions that cause full penetration of the prism tips into the adhesive. Under one set of lamination conditions, the lamination temperature is set at 180° F. with a lamination speed of 1"/s (2.5 cm/s) or greater. Full penetration of the prism tips into the adhesive layer maximizes adhesion, reduces sample variation, and increases the likelihood that the resulting laminated construction does not change with time and temperature. All the samples discussed above were laminated under the same lamination conditions, and so the lamination conditions were not necessarily optimum for each sample.

Figure 9:
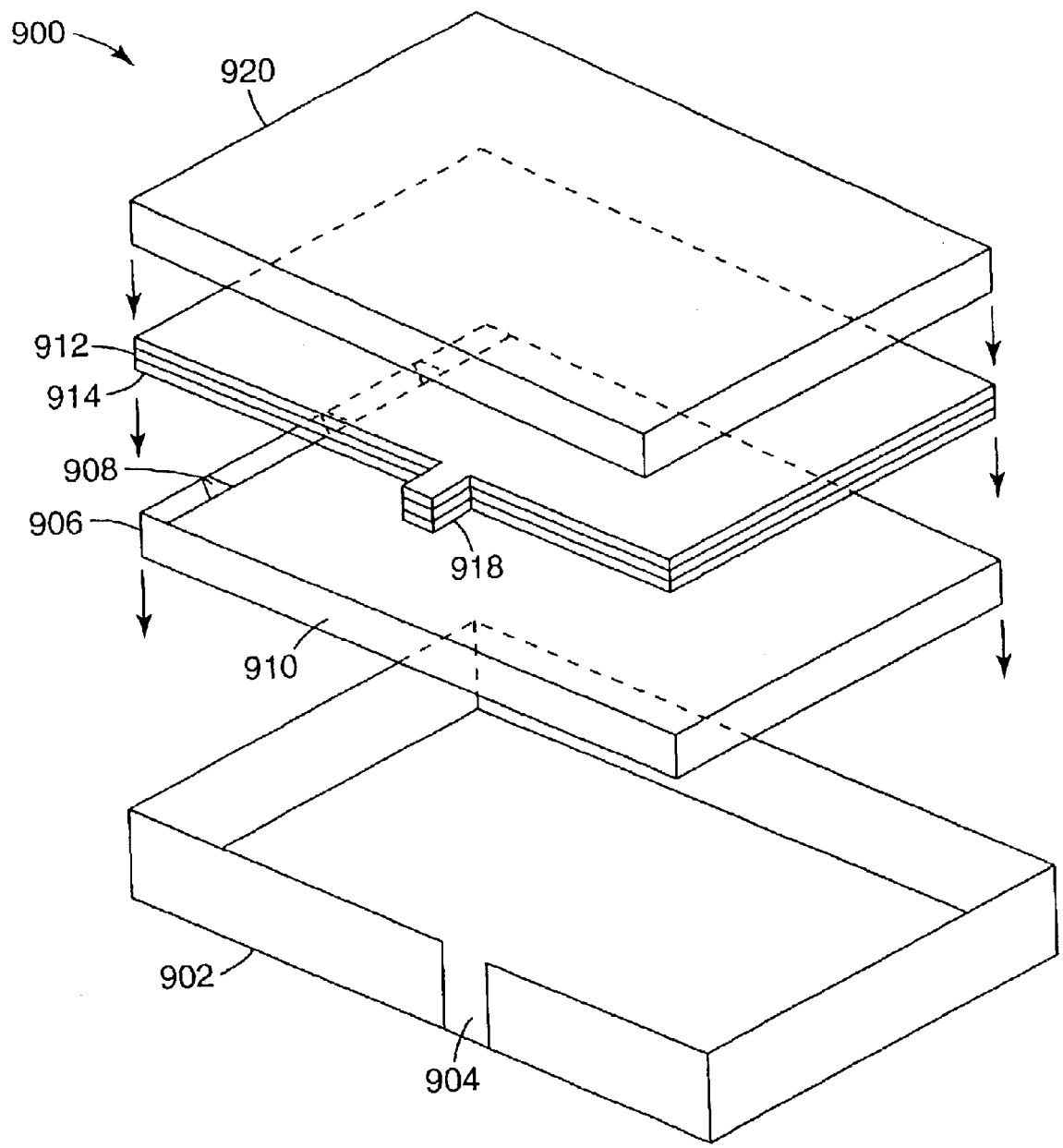
FIG. 9 schematically presents a perspective view of an embodiment of a display unit fabricated according to principles of the present invention.

An exploded view of a display 900 is presented in FIG. 9, showing how the different parts of a display are assembled to form the display. The display 900 uses a frame 902 to contain the other components. The frame 902 may contain one or more slots 904, or other alignment features, for example pins or the like, for aligning the films in the light management film stack.

The backlight assembly 906 is the first component placed within the frame 902. The backlight assembly 906 includes one or more light sources 908 that illuminate the edge of the light guide 910. The light management film stack 912 is then positioned above the backlight assembly 906. The light management film stack 912 includes two or more light management films 914 that are bonded together in the manner described above for surface structured films. The display element 920, for example a liquid crystal display element, including polarizers, is positioned above the light management film stack 912.

It will be appreciated that the light sources 908 and the display element have electrical connections to receive electrical power and control signals. The electrical connections are not shown.

Figure 10:
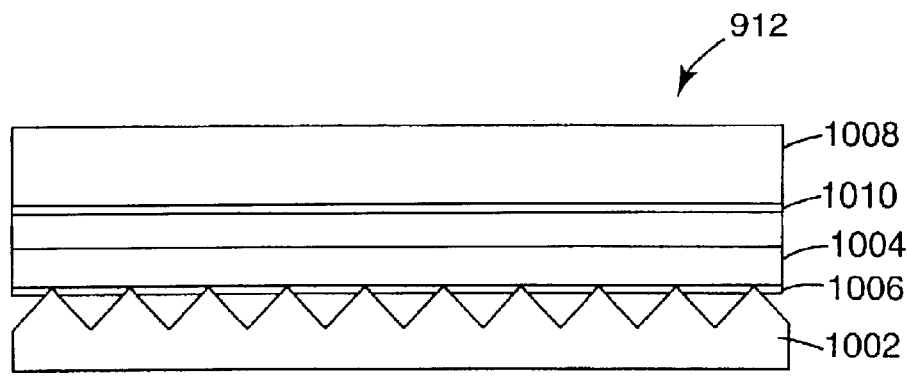
FIG. 10 schematically illustrates another embodiment of a light management film stack according to principles of the present invention.

A cross-sectional view through an embodiment of the film stack 912 is schematically presented in FIG. 10. In this particular embodiment, the lower film is a prismatically structured film 1002 with its prismatic ribs oriented in a first orientation (out of the plane of the figure). Above the lower film 1002 is a second prismatic film 1004, with its prismatic ribs oriented perpendicular (parallel to the plane of the figure) to those of the first film 1002. The second prismatic film 1004 has an adhesive layer 1006 on its lower surface. At least some of the structure features, in this case prismatic ribs, of the lower film 1002 penetrate into the adhesive layer 1006.

The upper film 1008, which may be, for example, a reflective polarizer, a diffuser film, or the like, has a second adhesive layer 1010 on its lower surface. At least some of the structure features of the second prismatic film 1004 penetrate into the second adhesive layer 1010.

It will be appreciated that other optical film layers may be added to the stack 912. Such additional film layers need not be attached to the stack, or may be attached to the other film layers of the stack using the same or different approaches. For example, one or more film layers may be attached using a zero-thickness bonding technique as discussed in co-owned U.S. patent application Ser. No. 10/346,615, or may be attached using other techniques.

Figure 11:
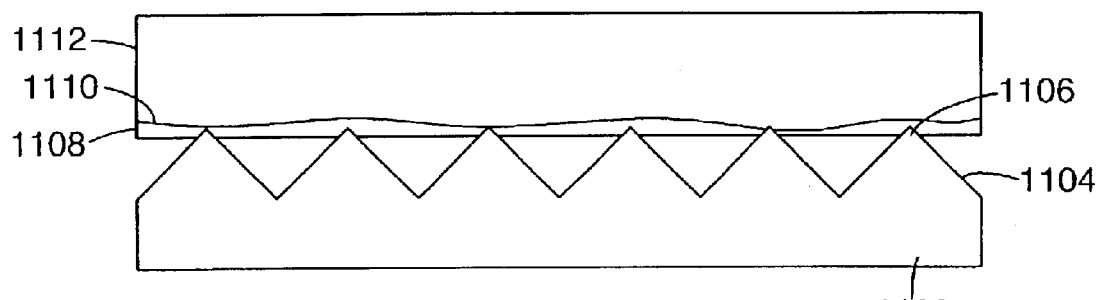
FIG. 11 schematically illustrates another embodiment of a light management film stack according to principles of the present invention.

Different approaches may be used to reduce or prevent the degradation of the optical quality of the stacked films. For example, care is taken to reduce the presence of contaminant particles between the films that may lead to Newton's rings. Further, one or both of the surfaces that touch together may be provided with small height variations to reduce wet-out, for example as is discussed in U.S. Pat. No. 6,322,236, incorporated herein by reference. This is shown schematically in FIG. 11, which shows a first film 1102 having a structured surface 1104 with features 1106 penetrating into the adhesive layer 1108 on the lower surface 1110 of a second film 1112. The lower surface 1110 is not flat, but is provided with random variations in height to prevent wet-out along the prismatic ribs of the first film 1102.

Figure 12:
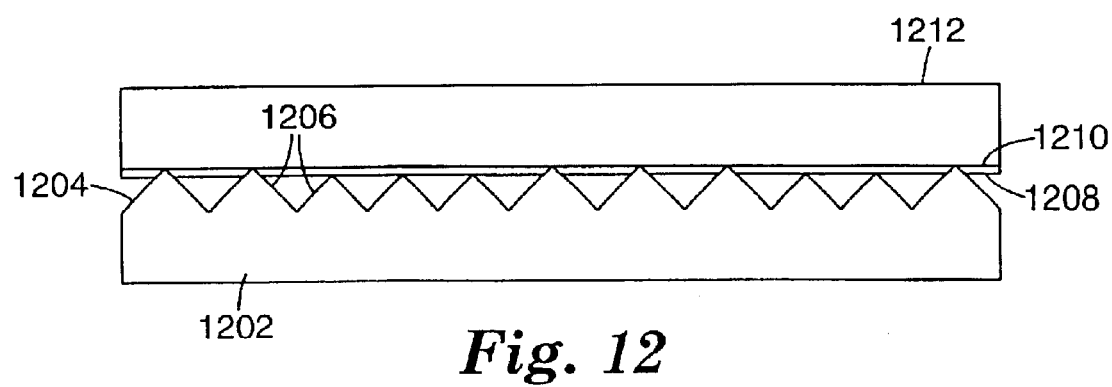
FIG. 12 schematically illustrates another embodiment of a light management film stack according to principles of the present invention.

In another approach, a prismatically structured film may be provided with a variable height structured surface, as described in U.S. Pat. No. 5,771,328, incorporated herein by reference. This is illustrated schematically in FIG. 12, which shows a first film 1202 having a structured surface 1204. In this particular embodiment, the structured surface 1204 includes prismatically ribbed features 1206 having different heights. The tallest features 1206 penetrate farthest into the adhesive layer 1208 on the lower surface 1210 of the upper layer 1212. In the illustrated embodiment, the tallest features 1206 are pressed into the adhesive layer 1208 up to the lower surface 1210 of the upper layer. Other features 1206 that are not as tall either do not reach to the surface 1210 or may not even penetrate the adhesive layer 1208.

Figure 13:
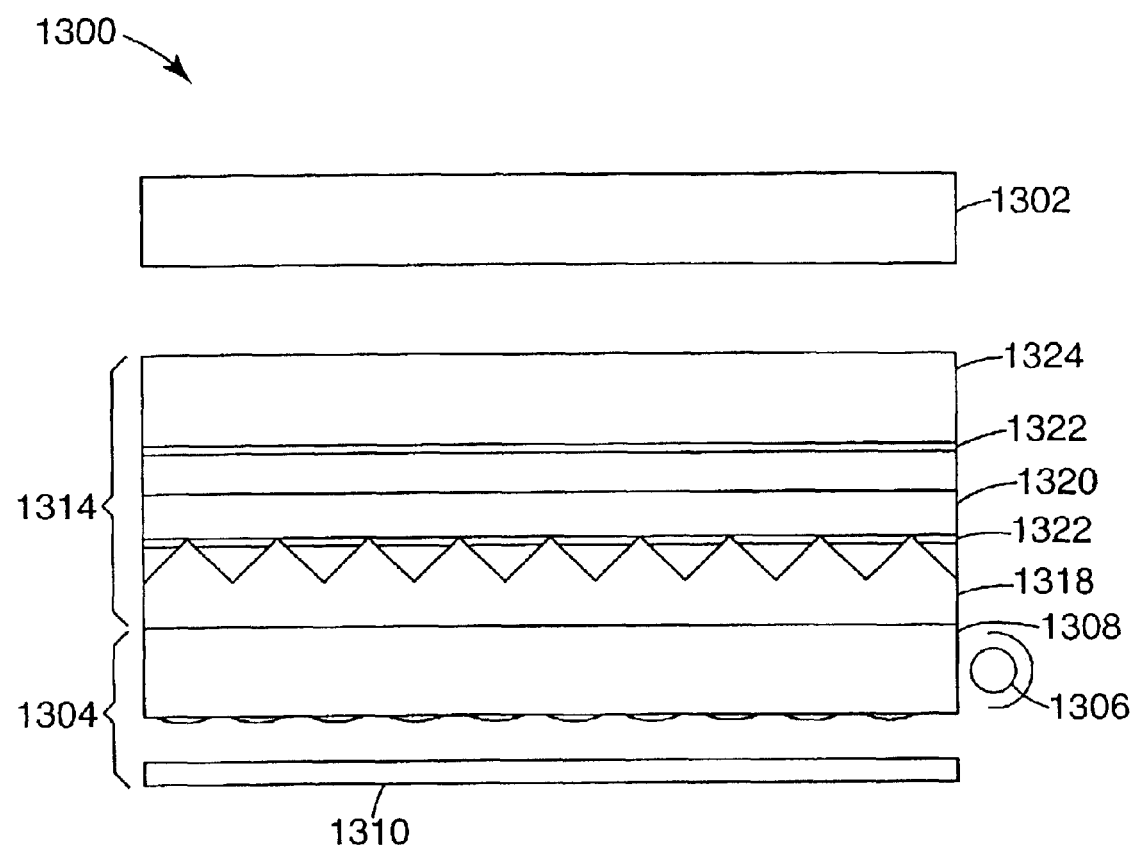
FIG. 13 schematically illustrates an embodiment of a display unit according to principles of the present invention FIGS. 14A, 14B, and 14C schematically illustrate additional embodiments of a display unit according to principles of the present invention.

The bonded, light management film stack may also be bonded directly to another of the display components. One example of such a display is schematically illustrated in FIG. 13. In this particular embodiment, a bonded film stack 1314 is formed from a bonded stack films 1318–1324. The display also includes a display element 1302 and a backlight assembly 1304, having a light source 1306 and a light guide 1308. The bonded optical film stack 1314 may have been bonded together previously using one of aforementioned methods and then anchored to the chosen display element. In another approach, the bonding process may be performed during the final mounting to the chosen display element.

In the illustrated embodiment, the bonded film stack 1314 is attached to the backlight assembly 1304, for example along an edge of the backlight assembly 1304. In another embodiment, the optical film stack 1314 may be anchored to the display element 1302 or to the frame (not illustrated). This approach may be advantageous as it may be performed mechanically, thereby avoiding manual insertion of the optical film stack. In this way, the introduction of defects may be minimized and manufacturing throughput and unit costs can be improved.

Figure 14A:
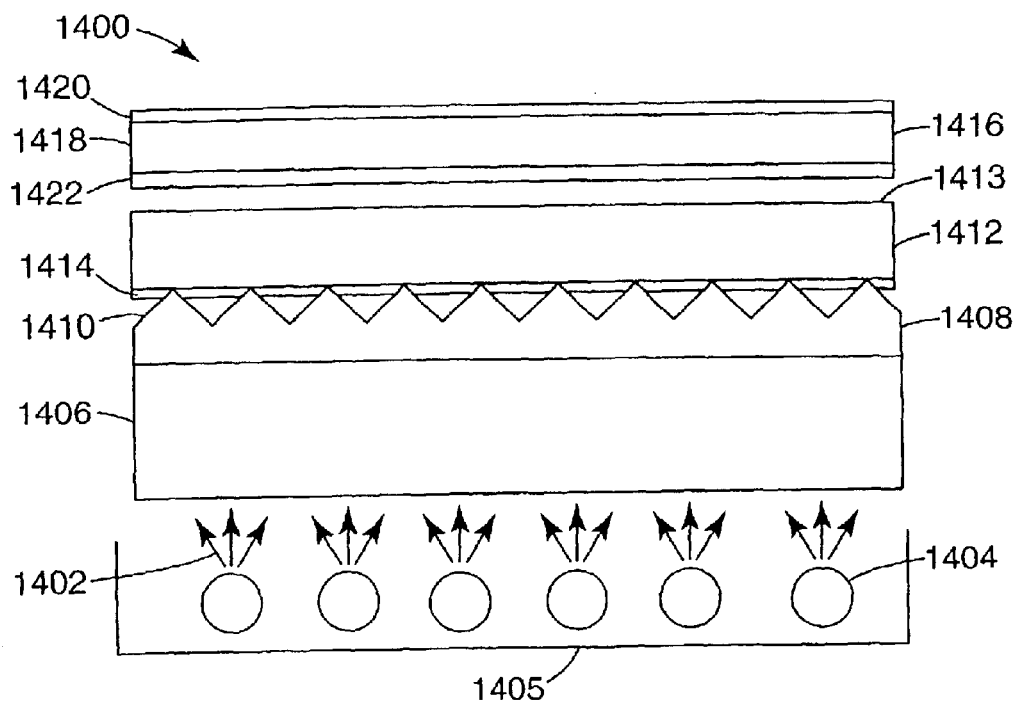
Figure 14B:
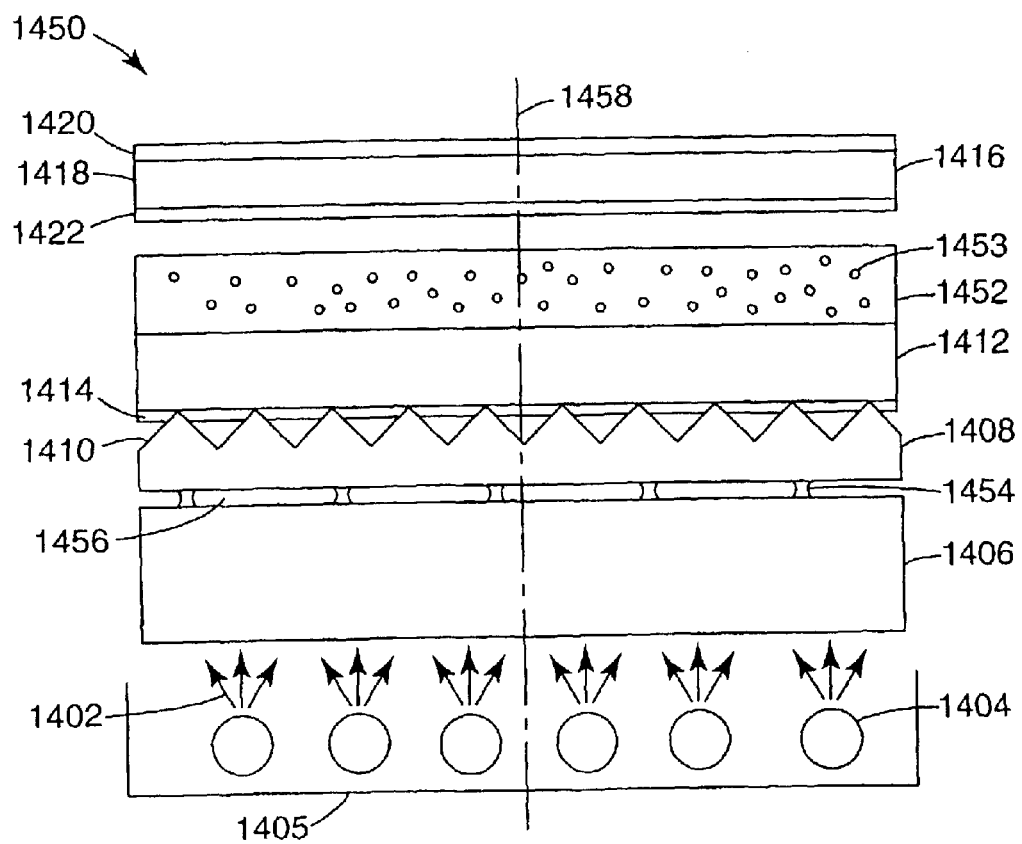
Figure 14C:
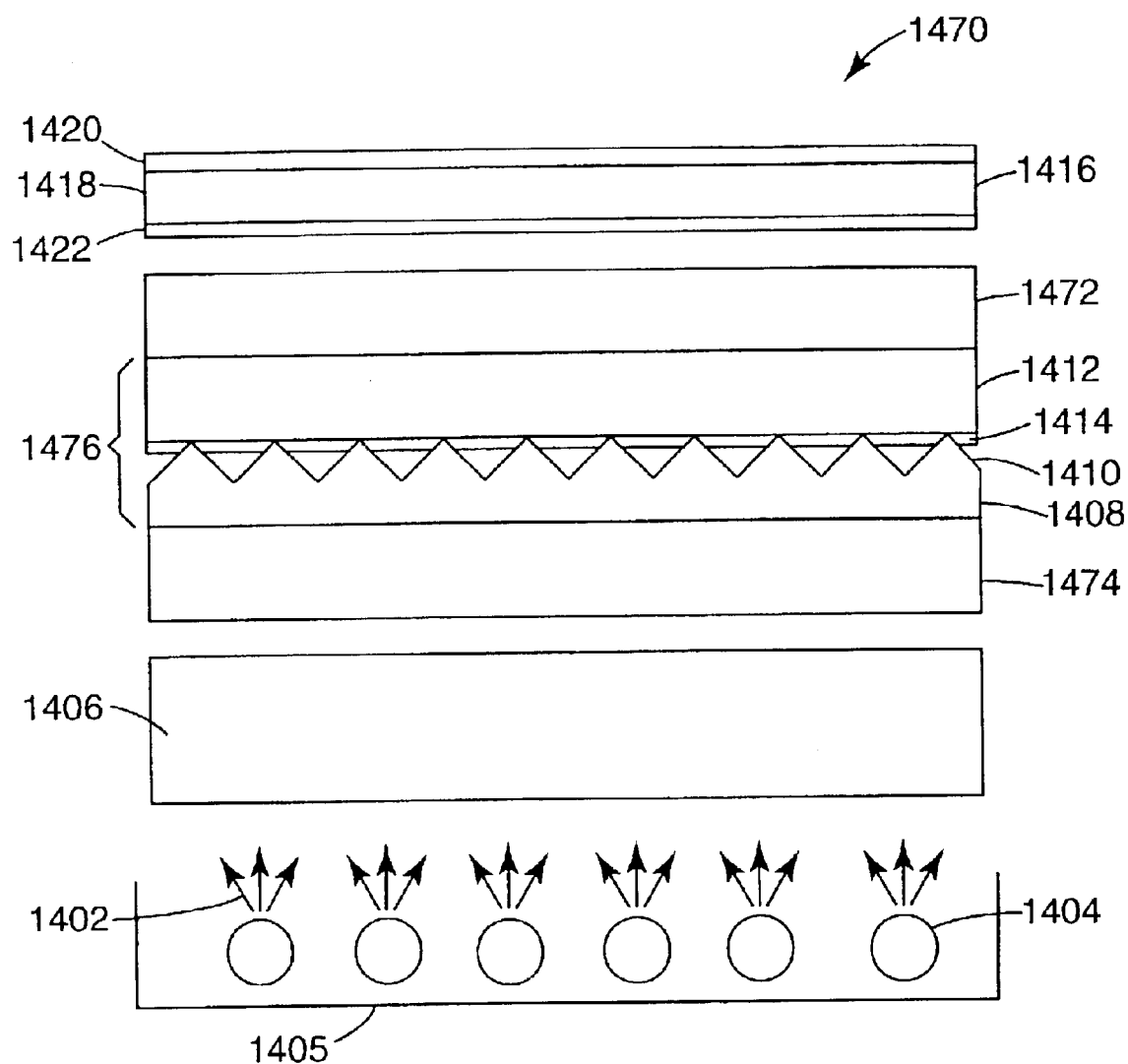

Two embodiments of a display that may be particularly useful for LCD television screens and bther large displays are schematically illustrated in FIGS. 14A, 14B and 14C. In the display 1400 illustrated in FIG. 14A, light 1402 is generated by one or more light sources 1404. The light sources 1404 may be any suitable type of light source, or combination of light sources, that achieves the desired color in the illuminating light 1402. Examples of light sources include cold cathode fluorescent tubes, light emitting diodes and the like. A reflector 1405 may be positioned behind the light sources 1404 to reflect light that is emitted away from the display back towards the display. The reflector 1405 may be a diffuse reflector so as to help make the illumination of the display more uniform. The reflector 1405 may take one of several different forms, including that of a sheet reflector placed below the light sources 1404 and also that of a reflecting box or cavity (illustrated) with reflecting surfaces along the side. The reflector 1405 need not be flat, and may have a desired shape.

The light 1402 enters a diffusing plate 1406, which is used to diffuse the light so that the viewer perceives a uniform image brightness across the display 1400. The diffusing plate 1406 may be a few millimeters thick to provide rigidity, and may contain diffusing particles. The diffusing plate 1406 may be formed of any suitable material, for example polycarbonate or poly methyl methacrylate (PMMA).

After passing through the diffusing plate 1406, the light has a wide viewing angle. Television screens typically use a wide horizontal viewing angle so that viewers may be able to see the image from a wide range of angles relative to the screen normal. The vertical viewing angle, on the other hand is typically less than the horizontal viewing angle, since the vertical position of the viewers relative to the screen normal is usually spread over a much smaller range than the horizontal spread. Therefore, it is advantageous to reduce the vertical viewing angle relative to the horizontal viewing angle, which results in the image becoming brighter. A layer of prismatic brightness enhancing film 1408 may be used to reduce the vertical viewing angle of the light that has passed through the diffusing plate 1406. The prismatic brightness enhancing film 1408 may be adhered to the diffusion plate 1406 In another embodiment, there may be an air gap between the film 1408 and the diffusion plate 1406, or there may be intervening layers between the film 1408 and the plate 1408.

The LCD 1416 usually includes a layer of liquid crystal 1418 sandwiched between first and second absorbing polarizers 1420 and 1422. The light 1402 from the light sources 1404 is typically unpolarized, so a reflective polarizer 1412 may be inserted between the brightness enhancing layer 1408 and the LCD 1416 to recycle the light in the polarization state that would otherwise be absorbed in the second absorbing polarizer 1422. The light reflected by the reflective polarizer 1412 may subsequently have its polarization rotated, at least partially, for example through diffuse reflection or by passing through a polarization rotating element (not shown). When it is returned to the reflective polarizer 1412, at least a portion of the reflected light is in the polarization state that is transmitted reflecting polarizer 1412 and the second absorbing polarizer 1422. The reflective polarizer 1412 may be any suitable type of reflective polarizer, for example wire grid polarizer, a diffusely reflecting polarizer or a multiple polymer layer reflective polarizer. In addition, the reflective polarizer may be a cholosteric polarizer, and may include a retardation plate to match the polarization of the transmitted light to the transmission polarization state of the second absorbing polarizer 1422.

The prismatically structured surface 1410 of the prismatic brightness enhancing film 1408 may be attached to the reflective polarizer layer 1412 via a layer 1414 of adhesive. The peaks of the prismatically structured surface penetrate at least part way into the adhesive 1414, and may penetrate completely through the adhesive 1414 to the lower surface of the reflective polarizer layer 1412, in the manner described above. Furthermore, the depth of penetration into the adhesive 1414 may be controlled in order to tune the vertical viewing angle. A greater the depth of penetration leads to a greater vertical viewing angle.

Light that has passed through the reflective polarizer 1412 is then directed to the LCD 1416, which imposes an image on the light passing to the viewer. The second absorbing polarizer 1422 may remain separated from the reflective polarizer 1412, or may be adhered to the reflective polarizer 1412. The outer surface 1424 of the first absorbing polarizer 1420 may be treated with one or more surface treatments. For example, the outer surface 1424 may be provided with a matte finish or an anti-glare coating. The outer surface 1424 may also be provided with a hard coating to provide protection against scratching.

Additional diffusion may be provided within the screen 1400, in addition to that provided in the diffusion plate 1406. For example, the adhesive 1414 may include diffusing particles. Also, there may be a diffusing layer provided on one or both sides of the reflective polarizer 1412, for example a layer of diffusing adhesive between the reflective polarizer 1412 and the second absorbing polarizer 1422. The reflective polarizer 1412 itself may be diffusive, for example by including diffusive particles in reflective polarizer 1412.

In another embodiment of the display 1450, schematically illustrated in FIG. 14B, a bulk diffuser layer 1452 is provided between the reflective polarizer 1412 and the second absorbing polarizer 1422. The bulk diffuser layer 1452 may be formed from any suitable type of matrix material, including, but not limited to, polycarbonate, PMMA, polyethylene and the like. Bulk diffusion is provided by a plurality of diffusing particles 1453, typically a few μm in size, disposed throughout the matrix material. The diffusing particles have a refractive index different from that of the matrix material, and may be formed from, interalia, glass beads, polystyrene beads, titanium dioxide particles or other diffusing particles.

The display 1450 may also be provided with a structured layer of adhesive 1454 between the prismatic brightness enhancing film 1408 and the diffusion plate 1406. The structured layer of adhesive 1454 provides one or more air gaps 1456 between the prismatic brightness enhancing film 1408 and the diffusion plate 1406, which increases the ability of the brightness enhancing film 1408 to redirect light in a direction closer to the axis 1458 of the display 1450. The structured layer 1454 of adhesive may include ribs, parallel or non-parallel to the ribs of the prismatic brightness enhancing film 1408, or may be formed using some other pattern, for example a two dimensional pattern. The structured layer 1454 of adhesive advantageously has a low fill factor, so that a large fraction of the light passing from the diffuser plate 1406 into the film 1408 passes through the air gap 1456. It will be appreciated that other bonding methods may be used to provide an air gap at the lower surface of the prismatic brightness enhancing film 1408. In one example, a structured layer may be bonded between the diffusion plate 1406 and the film 1408, the structured layer having recesses on its upper surface to form air gaps with the lower surface of the film 1408.

It will be appreciated that additional layers and/or surface treatments may be used in any of the displays described above. For example, the upper surface 1413 of the reflective polarizer 1412 may be a matte surface so as to increase light diffusion and thus increase the uniformity of the illumination of the light on the LCD 1416. One or more layers of the displays may be provided with an antistatic coating, for example a thin layer of electrically conductive material. One example of a suitable conductive material is indium tin oxide (ITO), although other conductive materials, such as conducting polymers, may be used.

Another useful embodiment of a display screen 1470 is schematically illustrated in FIG. 14C. In this embodiment, the prismatic brightness enhancement film 1408 and the reflective polarizer layer 1412 are placed between two support sheets 1472 and 1474. The support sheets 1472 and 1474 may be formed of any suitable material that is transmissive and, particularly for the upper support sheet 1472, is polarization preserving. The support sheets may be made from, for example, polycarbonate or other suitably rigid, environmentally stable and mechanically robust material. The support sheets 1472 and 1474 may have any required thickness. For example, polycarbonate support sheets 1472 and 1474 may have a thickness in the range of approximately 2–20 thousandths of an inch (0.05 mm–0.5 mm), and most preferably around 10 thousandths of an inch (0.25 mm), although the thickness may also be outside this range.

The support sheets 1472 and 1474 are bonded to the reflective polarizer 1412 and the prismatic brightness enhancement film 1408 respectively, for example by using an adhesive or by lamination. This construction provides added rigidity to the bonded reflective polarizer/prismatic film combination 1476, thus providing protection during handling and assembly of the display 1470. It is particularly advantageous that, where the two support sheets 1472 and 1474 are formed of the same material, that the thicknesses of the two support sheets 1472 and 1474 be the same. This reduces the likelihood that the combination 1476 warps when exposed to different temperatures. In another embodiment, the prismatic brightness enhancement film 1408 may be formed directly, for example by replication, on a layer sufficiently thick to provide the desired rigidity and mechanical performance, thus obviating the need for a separate lower support sheet 1474.

It will be appreciated that the prismatic brightness enhancement layers described herein may have any suitable prism size and apex angle. While it is common that the apex angle of the prisms is around 90°, there is no restriction on the apex angle. There may, however, be preferred ranges of apex angle depending on the particular light source used and the particular application of the display, that provide enhanced brightness. Furthermore, the length of the prism base may any value within a wide range of values. The length of the prism base is typically affected by such factors as the type of display, the allowable thickness of the film stack, and the thickness of the adhesive. For example, in hand-held displays, where the viewer is close to the display and the film stack needs to be thin, then the prism base length is shorter, in the range of a few 10's of microns. The adhesive layer is, consequently, fairly thin. In LCD-TVs, on the other hand, where the viewer is further away from the screen, and the lhickness of the display is less restricted, the size of the prism may be larger, and may be in the range of a few 100's of microns. Larger prisms enable the use of a thicker adhesive layer without affecting the gain (on-axis brightness) of the light passing through the display. This aids the stability of the construction of the LCD-TV display, where the screen size may be up to 60 inches (1.5 m) or more.

The use of a bonded film stacks, or bundled films, in such devices as flat panel displays, offers several advantages. Many of the light management films used in a display, particularly a hand-held display, are very thin. For example the prismatically structured films may each have a thickness of about 62 μm, while a reflective polarizer may have a thickness in the range 1 μm to 100's of μm. Such thin films are very flexible, which may cause problems during assembly of the display. Bundling multiple thin, flexible films, on the other hand, creates a stiffer film pack, which can ease assembly issues. Eliminating the sequential stacking of discrete layers when assembling the display also minimizes the probability of defect introduction and ultimate yield loss. Additionally, since films are usually delivered by the manufacturer to the display integrator with protective linings on either side, the number of protective liners that the display integrator has to remove is reduced when the films are bundled. This further optimizes yield and manufacturing unit costs.

Also, the bundling of optical films may improve final inspection and quality yield versus the separate examination of each discrete film layer. This can be easily considered when using structured optical films, which may tend to distort and camouflage defects in underlying or other film bundle layers that would otherwise be detected if these layers were inspected individually. Finally, bundling options, such as the method of attaching structured films discussed above, can provide for bundled stacks with very little increase in the stack thickness.

Optical films are often fabricated in large sheets, in some cases on a roll. The individual film pieces that are assembled in a display are cut from the large sheet, usually by a die. Several different approaches may be used for bonding the films into bonded stacks. For example, the films may be die-cut to the appropriate shape, a layer of adhesive spread on the lower surface of a film facing the structured surface of another film, and then the films are aligned in a stack and bonded. In other approaches, the films may be bonded first, before being cut, for example by a die. Furthermore, films may be bonded two or more at a time. Therefore, it should be appreciated that a stack that includes three or more films may be formed using two or more bonding steps. For example, the first two films may be bonded together to form the bonded stack and then one or more additional films bonded to the stack in one or more bonding steps.

One particular example of a method for bonding at least two films together is now described with reference to FIG. 15. In this particular embodiment, a first film roll 1502 contains a roll of film that has a liner on at least one side. The liner 1504 is stripped by a stripping roll 1506. A second film roll 1508 may also contain a roll of film that has a liner on at least one side. The liner 1510 is stripped by a second stripping roll 1512. The stripped films 1514 and 1516 pass towards a pinch roller pair 1518.

A coater 1520 deposits a layer of adhesive 1522 of the appropriate thickness on the surface of the lower film 1516 before the pinch roller 1518 pair. On passing through the pinch roller pair 1518, the structured surface 1524 of the upper film is pressed into the adhesive layer 1522 to the desired depth.

After passing through the pinch roller pair 1518, the adhesive 1522 between the two films 1514 and 1516 is cured, for example by illumination with a UV lamp 1526. The layered film 1528 may then be passed to a die 1530 for cutting to the appropriate shape. The die 1530 may be a rotary die for continuous cutting of the layered film 1528. In one particular embodiment, the rotary die 1530 is formed from a die roller 1532 and an anvil roller 1534. The separation between the die and anvil rollers 1532 and 1534 may be set so that the die roller 1532 kiss cuts through the layered film 1528 to a controlled depth, to the lower liner of the lower film. The peripheral weed 1536 may then be stripped away, leaving an array of film stacks 1538 on the lower liner layer 1540. The cut film 1540 may be collected on collection roll 1542.

The two films 1514 and 1516 may be any light management films, although the upper film 1514 has a structured surface 1524 facing towards the lower film 1516. The structured surface 1524 may be, for example, a prismatically structured surface with prismatic ribs for a brightness enhancing film. In one embodiment, the upper film 1514 may be a prismatically structured film with the ribs oriented across the web of the film 1514, while the lower film 1516 is a prismatically structured film with the ribs oriented along the web of the film 1514, or vice versa.

Figure 15:
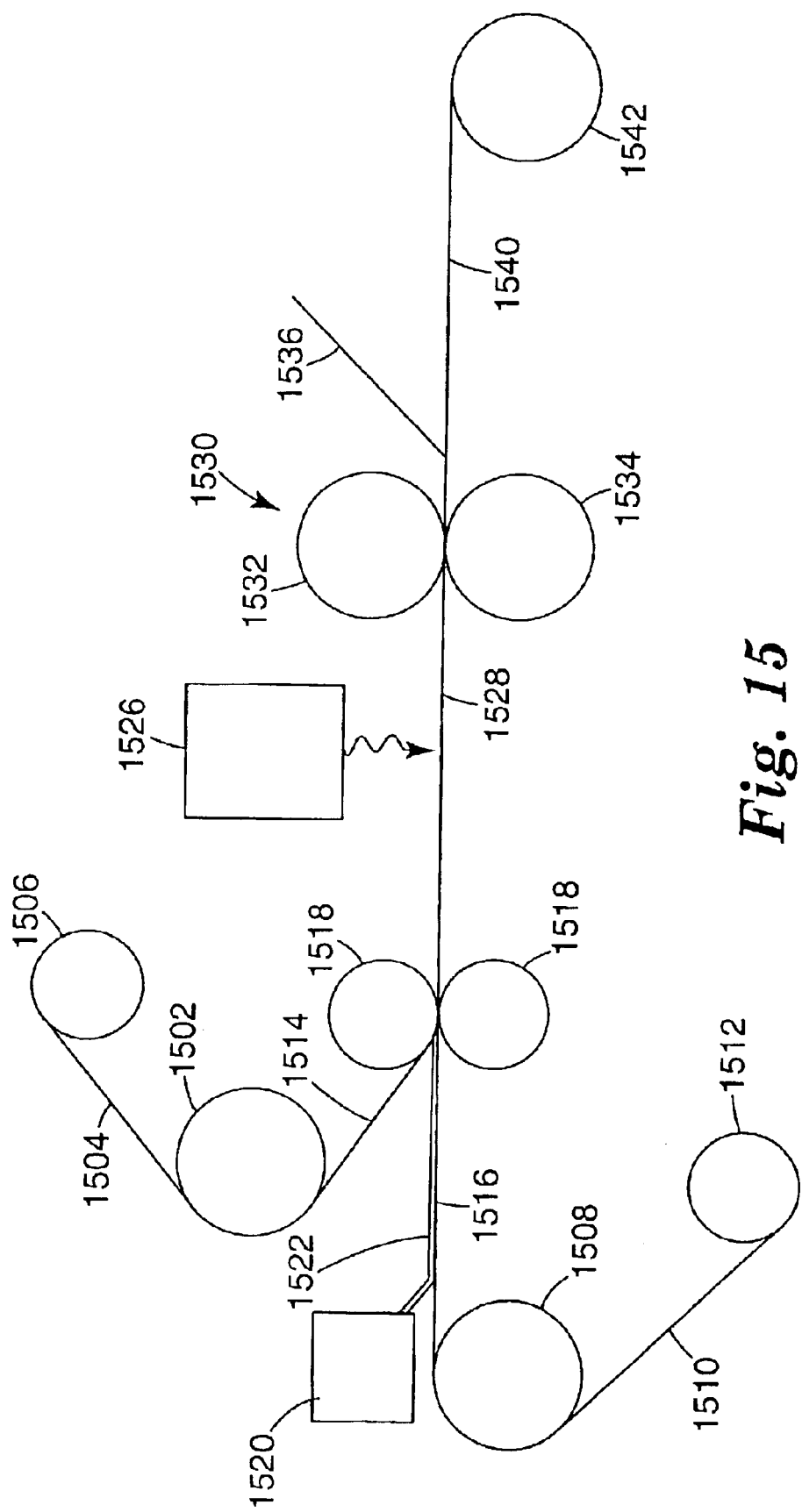
FIG. 15 schematically illustrates an embodiment of a method of manufacturing a light management film stack according to principles of the present invention.

It will be appreciated that variations of the system illustrated in FIG. 15 may be used. For example, the processes of welding and cutting may be combined into a single pair of rollers that make ultrasonic welds and die cut simultaneously. For example, the raised portions of the die may transfer ultrasonic energy to the film so as to weld the films at the die cuts.

In another method of stacking bonded sheets, the two rolls contain prismatically structured film, each having the ribs structured along the web. In such a situation, the films 1514 and 1516 from the two rolls 1502 and 1510 may cross at right angles to each other, so that the stacked prismatic films are crossed in a pinch/cutter roller. A coater may be used to coat one of the films before entering the pinch/cutter roller so that so the two films are pressed together and cut to form the desired film stack.

It will be appreciated that variations of the system illustrated in FIG. 15 may be used. For example, a third film, or additional films, may be added to the stack that is welded by the ultrasonic welder. For example, a third film may be added to the lower surface of the film 1516, along with a layer of adhesive, to produce a structure as illustrated in FIG. 15. Additional film layers may also be added, either at a time different from when the first two films 1514 and 1516 are laminated together, or at the same. Furthermore, instead of feeding continuous sheets, one or more of the sheets may be fed as individual sections from respective sheet feeders. Additional layers of adhesive may be inserted between the additional sheets, or additional sheets may be attached to the film stack using another approach, for example the approach described in U.S. patent application Ser. No. 10/346,615, incorporated herein by reference. It will be appreciated that other approaches for stacking, bonding and cutting films be followed, within the scope of the invention.

As noted above, the present invention is applicable to optical displays and is believed to be particularly useful for manufacturing optical display film units that are easier to handle, that reduce the time and complexity of assembling a display unit, and that permit the gain and viewing angle to be adjusted. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A light management film package for managing light within a display, comprising:
    a first, brightness enhancing optical film having a first surface structured with prismatic ribs, the ribs having associated rib heights;
    a second optical film having a second surface opposing the first surface of the first optical film; and
    a first layer of adhesive on the second surface, at least some of the prismatic ribs of the first surface penetrating into the first layer of adhesive, the first layer of adhesive having a thickness less than the associated rib heights of the ribs penetrating into the first adhesive layer.

2. A film package as recited in claim 1, wherein at least one of the prismatic ribs has a symmetrical cross-section.

3. A film package as recited in claim 1, wherein the second optical film is a prismatic brightness enhancing film having a non-ribbed surface oriented towards the First optical film and a prismatically structured surface with light-directing, ribbed prisms on a surface directed away from the first optical film.

4. A film package as recited in claim 3, wherein the light directing, ribbed prisms on the second surface of the second film are oriented substantially perpendicular to the prismatic ribs of the first film.

5. A film package as recited in claim 1, wherein the second optical film further includes a second structured surface, the second structured surface including structure features with associated feature heights, and further comprising a third optical film having a third surface and a second layer of adhesive on the third surface, at least some of the structure features of the second structured surface of the penetrating into the second layer of adhesive.

6. A film package as recited in claim 5, wherein the second layer of adhesive has a thickness less than the feature heights of the structure features penetrating into the second adhesive layer.

7. A film package as recited in claim wherein the first and second optical films are prismatic, light directing films, and the third optical film is a reflecting polarizer.

8. A film package as recited in claim 1, wherein a penetration depth of the structure features penetrating into the first adhesive layer is less than one half of the feature height of the features penetrating into the first adhesive layer.

9. A film package as recited in claim 8, wherein a penetration depth of the structure features penetrating into the first adhesive layer is less than one fifth of the feature height of the features penetrating into the first adhesive layer.

10. A film package as recited in claim 1, wherein the first layer of adhesive has a thickness of less than 5 $\mu$m.

11. A film package as recited in claim 1, wherein the second surface of the second film opposing the first surface of the first film is an anti-wet-out surface.

12. A film package as recited in claim 1, wherein the second optical film is a reflective polarizer.

13. A film package as recited in claim 12, further comprising a diffusing layer disposed on a side of the reflective polarizer facing away from the first optical film.

14. A film package as recited in claim 12, wherein the reflective polarizer and the first, brightness enhancing optical film together form a bonded combination and further comprising a support sheet on at least one side of the bonded combination.

15. A film package as recited in claim 12, further comprising a diffusion plate disposed to a second side of the first optical film opposite the first surface.

16. A film package as recited in claim 15, further comprising a structured layer of adhesive disposed between the first optical film and the diffusion plate so as to provide at least one air gap between the first optical film and the diffusion plate.

17. A display system, comprising:
    an illumination unit;
    a display unit; and
    a light management unit disposed between the illumination unit and the display unit to manage light passing from the illumination unit source to the display unit, the light management unit comprising a first optical film having a first surface structured with prismatic ribs, the ribs having associated rib heights, a second optical film having a second surface opposing the first surface of the first optical film, and a first layer of adhesive on the second surface, at least some of the prismatic ribs of the first surface penetrating into the first layer of adhesive, the lirst layer of adhesive having a thickness less than the associated rib heights of the ribs penetrating into the first adhesive layer.

18. A system as recited in claim 17, further comprising a control unit coupled to the display unit to control an image displayed by the display unit.

19. A system as recited in claim 17, wherein the display unit includes a liquid crystal display layer.

20. A system as recited in claim 19, further comprising an absorbing polarizer layer on a viewing side of the liquid crystal display layers and an absorbing polarizer on a light source side of the liquid crystal display layer.

21. A system as recited in claim 17, wherein the illumination unit includes one or more light sources illuminating a light guide panel, light from the one or more light sources entering the light guide panel and passing through a side wall of the light guide panel to the light management unit.

22. A system as recited in claim 17, further comprising a frame holding the illumination unit, the light management unit and the display unit.

23. A system as recited in claim 22, wherein at least the lirst and second optical films of the light management unit include one or more peripheral alignment tabs for locating the light management unit within the frame.

24. A light management film package for managing light within a display, comprising:
    a first optical film having a first surface structured with refractive features, the refractive features including active refractive surfaces for light to pass therethrough; and
    a second optical film disposed over the first optical film, the second optical film having a second surface; and
    a first layer of adhesive on the second surface, at least some of the refractive features penetrating partially into the first layer of adhesive so as to leave a gap between the first adhesive layer and portions of the first surface, portions of the active surfaces of the penetrating features interfacing with the gap and other portions of the penetrating features interfacing with the first adhesive layer.

25. A film package as recited in claim 24, wherein the first surface is structured with prismatic ribs.

26. A film package as recited in claim 25, wherein at least one of the prismatic ribs has a symmetrical cross-section.

27. A film package as recited in claim 24, wherein the second optical film is a prismatic, light-directing film having a non-ribbed surface oriented towards the first optical film and a surface having prismatic ribs being directed away from the first optical film.

28. A film package as recited in claim 27, wherein the first surface is structured with prismatic ribs and the prismatic ribs on the second filrn are oriented perpendicular to the prismatic-ribs of the first film.

29. A film package as recited in claim 27, further comprising a third optical film having a third surface and a second layer of adhesive on the third surface, at least some of the prismatic ribs of the second optical film penetrating into the second layer of adhesive.

30. A film package as recited in claim 29, wherein the third optical film is a reflecting polarizer.

31. A film package as recited in claim 24, wherein a penetration depth of the refractive features penetrating into the first adhesive layer is less than one half of the feature height of the refractive features penetrating into the first adhesive layer.

32. A film package as recited in claim 24, wherein the second surface of the second film opposing the first surface of the first film is an anti-wet-out surface.

33. A film package as recited in claim 24, wherein the thickness of the first adhesive layer and a penetration depth of the first structured surface into the first adhesive layer are selected so that characteristics of light passing through the film package are different from characteristics of light passing through a stack of the first and second optical films without an adhesive layer.

34. A film package as recited in claim 24, wherein the second optical film is a reflective polarizer.

35. A film package as recited in claim 34, further a diffusing layer disposed on a side of the reflective polarizer facing away from the first optical film.

36. A film package as recited in claim 34, wherein the reflective polarizer and the first optical film together form a bonded combination and further comprising a support sheet on at least one side of the bonded combination.

37. A film package as recited in claim 34, further comprising a diffusion plate disposed to a second side of the first optical film opposite the first surface.

38. A film package as recited in claim 37, further comprising a structured layer of adhesive disposed between the first optical film and the diffusion plate so as to provide at least one air gap between the first optical film and the diffusion plate.

39. A display system, comprising:

an illumination unit;

a display unit; and a light management unit disposed between the illumination unit and the display unit to manage light passing from the illumination unit source to the display unit, the light management unit cornprising a first optical film having a first surface structured with refractive features, the refractive features including active refractive surfaces for light to pass therethrough, a second optical film disposed over the first optical film, the second optical film having a second surface and a first layer of adhesive on the second surface, at least some of the refractive features penetrating partially into the first layer of adhesive so as to leave a gap between the first adhesive layer and portions of tho first surface, portions of the active surfaces of the penetrating features interlacing with the gap and other portions of the penetrating features intergacing with the first adhesive layer.

40. A system as recited in claim 39, further comprising a control unit coupled to the display unit to control an image displayed by the display unit.

41. A system as recited in claim 39, wherein the display unit includes a liquid crystal display layer.

42. A system as recited in claim 41, further comprising an absorbing polarizer layer on a viewing side of the liquid crystal display layers and an absorbing polarizer on a light source side of the liquid crystal display layer.

43. A system as recited in claim 39, wherein the illumination unit includes one or more light sources illuminating a light guide panel, light from the one or more light sources entering the fight guide panel and passing through a side wall of the light guide panel to the light management unit.

44. A system as recited in claim 39, lurthercomprising a frame holding the illumination unit, the light management unit and the display unit.

45. A system as recited in claim 44, wherein at least the first and second optical films of the light management unit include one or more peripheral alignment tabs for locating the fight management unit within the frame.

* * * * *

UNITED STATES PATENT AND TRADEMARK OFFICE
CERTIFICATE OF CORRECTION

PATENT NO. : 6,846,089 B2
DATED : January 25, 2005
INVENTOR(S) : Stevenson, James A.

It is certified that error appears in the above-identified patent and that said Letters Patent is hereby corrected as shown below:

Column 1,
Line 15, delete "(PDAS)" and insert -- (PDAs) --.
Line 19, delete "perfonmance" and insert -- performance --.

Column 3,
Line 59, after "invention" insert -- ; --.
Line 60, after "14B" delete ",".

Column 9,
Line 13, delete "IOAAA" and insert -- IOA/AA --.
Line 34, delete "rheodlogy" and insert -- rheology --.
Line 47, delete "IOA/MA/A" and insert -- IOA/MA/AA --.
Line 55, delt "IOAAA" and insert -- IOA/AA --.

Column 10,
Line 33, delete "1800" and insert -- 180° --.

Column 11,
Line 6, delete "cross-linking" and insert -- crosslinking --.

Column 13,
Line 30, delete "bther" and insert -- other --.

Column 14,
Line 5, after "1406" insert -- . --.

Column 16,
Line 15, delete "Furthernore" and insert -- Furthermore --.
Line 25, delete "lhickness" and insert -- thickness --.

Column 17,
Line 45, delete "stnuctured" and insert -- structured --.

Column 18,
Line 51, after "prismatic" insert -- , --.
Line 51, delete "First" and insert -- first --.

Column 19,
Line 5, after "claim" insert -- 5, --.
Line 50, delete "list" and insert -- first --.

UNITED STATES PATENT AND TRADEMARK OFFICE
CERTIFICATE OF CORRECTION

PATENT NO. : 6,846,089 B2
DATED : January 25, 2005
INVENTOR(S) : Stevenson, James A.

It is certified that error appears in the above-identified patent and that said Letters Patent is hereby corrected as shown below:

Column 20,
Line 7, delete "First" and insert -- first --.
Line 36, delete "filrn" and insert -- film --.
Line 37, delete "prismatic-ribs" and insert -- prismatic ribs --.

Column 21,
Line 15, delete "illuminaltion" and insert -- illumination --.
Line 17, delete "cornprising" and insert -- comprising --.
Line 22, delete "tho" and insert -- the --.

Column 22,
Line 2, delete "interlacing" and insert -- interfacing --.
Line 3, delete "intergacing" and insert -- interfacing --.
Line 16, delete "fight" and insert -- light --.
Line 18, delete "lurthercomprising" and insert -- further comprising --.
Line 22, delete "fight" and insert -- light --.

Signed and Sealed this

Third Day of January, 2006

JON W. DUDAS
*Director of the United States Patent and Trademark Office*